United States Patent
Rao et al.

(10) Patent No.: US 11,240,772 B2
(45) Date of Patent: Feb. 1, 2022

(54) OUT-OF-SYNCHRONIZATION PROCESSING METHOD, INTERMEDIATE COMMUNICATION APPARATUS, AND COMMUNICATION SYSTEM

(71) Applicant: SZ DJI TECHNOLOGY CO., LTD., Shenzhen (CN)

(72) Inventors: Xiongbin Rao, Shenzhen (CN); Xiaojun Yin, Shenzhen (CN); Ning Ma, Shenzhen (CN); Naibo Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 205 days.

(21) Appl. No.: 16/737,186

(22) Filed: Jan. 8, 2020

(65) Prior Publication Data
US 2020/0154386 A1   May 14, 2020

Related U.S. Application Data

(63) Continuation of application No. PCT/CN2017/095330, filed on Jul. 31, 2017.

(51) Int. Cl.
*H04W 56/00* (2009.01)
*H04W 4/40* (2018.01)
*G08G 5/00* (2006.01)

(52) U.S. Cl.
CPC ...... *H04W 56/0025* (2013.01); *G08G 5/0069* (2013.01); *H04W 4/40* (2018.02);
(Continued)

(58) Field of Classification Search
CPC ............... H04W 56/0035; H04W 4/40; H04W 56/0015; H04W 56/0025; H04W 56/0045;
(Continued)

(56) References Cited

U.S. PATENT DOCUMENTS

| 8,165,171 | B2 | 4/2012 | Preuss et al. |
| 2007/0281643 | A1 | 12/2007 | Kawai |
| 2011/0038252 | A1 | 2/2011 | Chung et al. |

FOREIGN PATENT DOCUMENTS

| CN | 101729127 A | 6/2010 |
| CN | 101932041 A | 12/2010 |

(Continued)

OTHER PUBLICATIONS

The World Intellectual Property Organization (WIPO) International Search Report for PCT/CN2017/095330 dated Apr. 26, 2018 6 pages.

*Primary Examiner* — Ashley Shivers
(74) *Attorney, Agent, or Firm* — Anova Law Group, PLLC

(57) ABSTRACT

An out-of-synchronization processing method implemented in an intermediate communication apparatus includes obtaining synchronization information for synchronizing with a downstream communication apparatus, and performing a search for an upstream communication apparatus and a communication with the downstream communication apparatus. A parameter is adjusted according to the synchronization information during the communication with the downstream communication apparatus.

20 Claims, 3 Drawing Sheets

---

Obtain first synchronization information for synchronizing the intermediate communication apparatus with the downstream communication apparatus — 401

Allocate time frames for performing, by the intermediate communication apparatus, a search for the upstream communication apparatus and a communication with the downstream communication apparatus — 402

(52) U.S. Cl.
CPC ... *H04W 56/0015* (2013.01); *H04W 56/0035* (2013.01); *H04W 56/0045* (2013.01); *H04W 56/0055* (2013.01)

(58) Field of Classification Search
CPC ............. H04W 56/0055; H04W 56/00; G08G 5/0069; G08G 5/0008; G08G 5/0013
See application file for complete search history.

(56) References Cited

FOREIGN PATENT DOCUMENTS

| | | | | |
|---|---|---|---|---|
| CN | 102510575 | A | 6/2012 | |
| CN | 102948189 | A | 2/2013 | |
| CN | 104243132 | A | 12/2014 | |
| JP | 2015061276 | A | 3/2015 | |
| WO | WO-2010036008 | A2 * | 4/2010 | ........... H04L 1/0001 |
| WO | WO-2011017846 | A1 * | 2/2011 | ........... H04W 56/00 |
| WO | WO-2011019975 | A1 * | 2/2011 | ........... H04W 56/00 |
| WO | 2016165430 | A1 | 10/2016 | |

* cited by examiner

OUT-OF-SYNCHRONIZATION PROCESSING METHOD, INTERMEDIATE COMMUNICATION APPARATUS, AND COMMUNICATION SYSTEM

CROSS-REFERENCE TO RELATED APPLICATION

This application is a continuation of International Application No. PCT/CN2017/095330, filed on Jul. 31, 2017, the entire content of which is incorporated herein by reference.

TECHNICAL FIELD

The present disclosure relates to the field of flight technology and, more particularly, to an out-of-synchronization processing method, an intermediate communication apparatus, and a communication system.

BACKGROUND

A multi-layer networking architecture includes at least three levels of nodes, i.e., an intermediate communication apparatus, an upstream communication apparatus of the intermediate communication apparatus, and a downstream communication apparatus of the intermediate communication apparatus. The intermediate communication apparatus communicates with the upstream communication apparatus and the downstream communication apparatus.

In conventional technologies, the intermediate communication apparatus needs to be synchronized with the upstream communication apparatus, and the downstream communication apparatus needs to be synchronized with the intermediate communication apparatus. The synchronization generally includes a frequency synchronization and a clock synchronization. Taking the intermediate communication apparatus being synchronized with the upstream communication apparatus as an example, when the upstream communication apparatus transmits data with a crystal oscillator frequency and a clock, the intermediate communication apparatus determines a frequency offset and a clock offset relative to the upstream communication apparatus to achieve the synchronization with the upstream communication apparatus. Generally, a crystal oscillator frequency drift of the upstream communication apparatus occurs due to an influence of temperature or the like, and the frequency drift of the upstream communication apparatus causes the intermediate communication apparatus to lose synchronization with the upstream communication apparatus (referred to as an out-of-synchronization). When the intermediate communication apparatus is out of synchronization with the upstream communication apparatus, the intermediate communication apparatus needs to continuously search for the upstream communication apparatus to resynchronize with the upstream communication apparatus.

However, because the intermediate communication apparatus continuously searches for the upstream communication apparatus, the downstream communication apparatus is caused to lose control.

SUMMARY

In accordance with the disclosure, there is provided an out-of-synchronization processing method implemented in an intermediate communication apparatus. The method includes obtaining synchronization information for synchronizing with a downstream communication apparatus, and performing a search for an upstream communication apparatus and a communication with the downstream communication apparatus. A parameter is adjusted according to the synchronization information during the communication with the downstream communication apparatus.

Also in accordance with the disclosure, there is provided an intermediate communication apparatus including an acquisition circuit configured to obtain synchronization information for synchronizing with a downstream communication apparatus, and a communication circuit configured to perform a search for an upstream communication apparatus and a communication with the downstream communication apparatus. A parameter is adjusted according to the synchronization information during the communication with the downstream communication apparatus.

Also in accordance with the disclosure, there is provided a communication system including an intermediate communication apparatus, an upstream communication apparatus, and a downstream communication apparatus. The intermediate communication apparatus includes an acquisition circuit configured to obtain synchronization information for synchronizing with a downstream communication apparatus, and a communication circuit configured to perform a search for an upstream communication apparatus and a communication with the downstream communication apparatus. A parameter is adjusted according to the synchronization information during the communication with the downstream communication apparatus.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples. Other drawings can be conceived by those having ordinary skills in the art on the basis of the disclosed drawings without inventive efforts.

DETAILED DESCRIPTION OF THE EMBODIMENTS

In order to provide a clearer illustration of purposes, technical solutions, and advantages of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
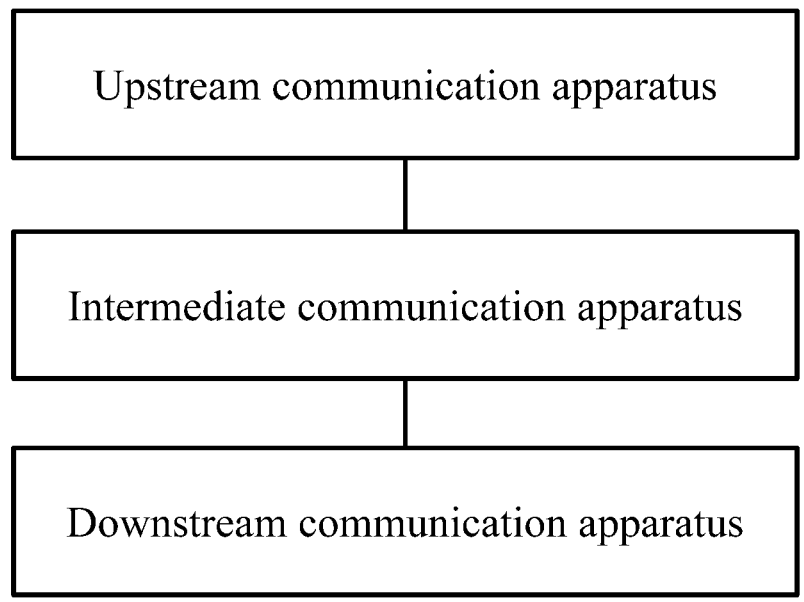
FIG. 1 shows a schematic architecture of an example communication system consistent with embodiments of the disclosure.

FIG. 1 shows a schematic architecture of an example communication system consistent with the disclosure. The communication system can implement an out-of-synchronization processing method consistent with the disclosure. As shown in FIG. 1, the communication system includes an intermediate communication apparatus, an upstream communication apparatus of the intermediate communication apparatus, and a downstream communication apparatus of the intermediate communication apparatus. The intermediate communication apparatus and the upstream communication apparatus can communicate with each other via a communication link between them. The intermediate communication apparatus and the downstream communication apparatus can communicate with each other via a communication link between them. The number of the upstream communication apparatus of the intermediate communication apparatus, and/or the number of the downstream communication apparatus of the intermediate communication apparatus may be one or more, which is not limited herein.

Figure 2:
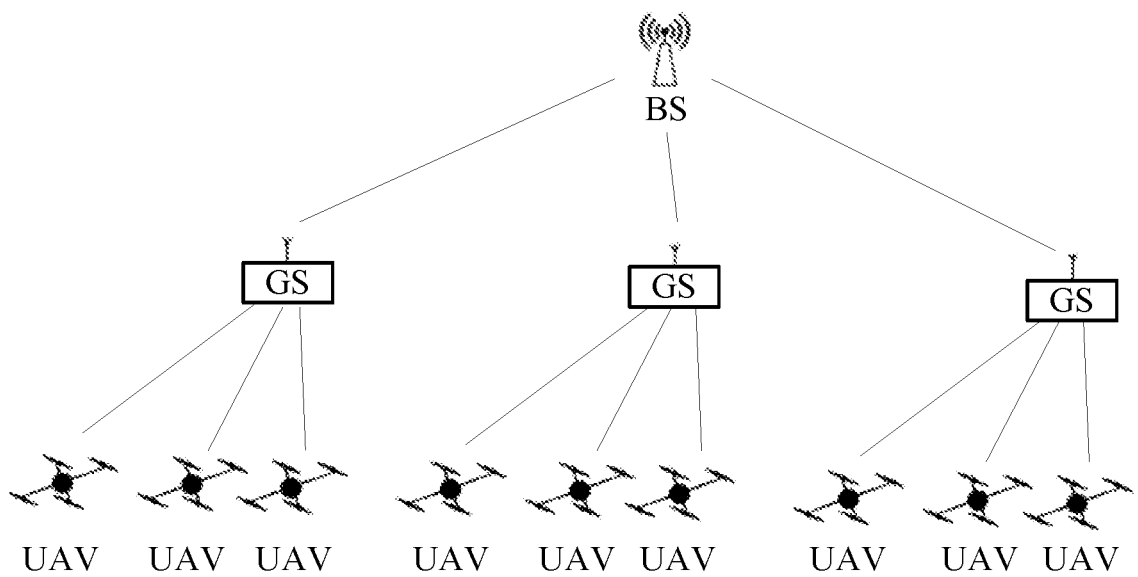
FIG. 2 schematically shows an example application scenario of an out-of-synchronization processing method consistent with embodiments of the disclosure.

FIG. 2 schematically shows an example application scenario of an out-of-synchronization processing method consistent with the disclosure. As shown in FIG. 2, for the application scenario of an agricultural unmanned aerial vehicle (UAV) communication system, the intermediate communication apparatus includes a console (GS), and the upstream communication apparatus includes a base station (BS), and the downstream communication apparatus includes a UAV. There are a two-way communication link between the BS and the GS and a two-way communication link between the GS and the UAV.

Figure 3:
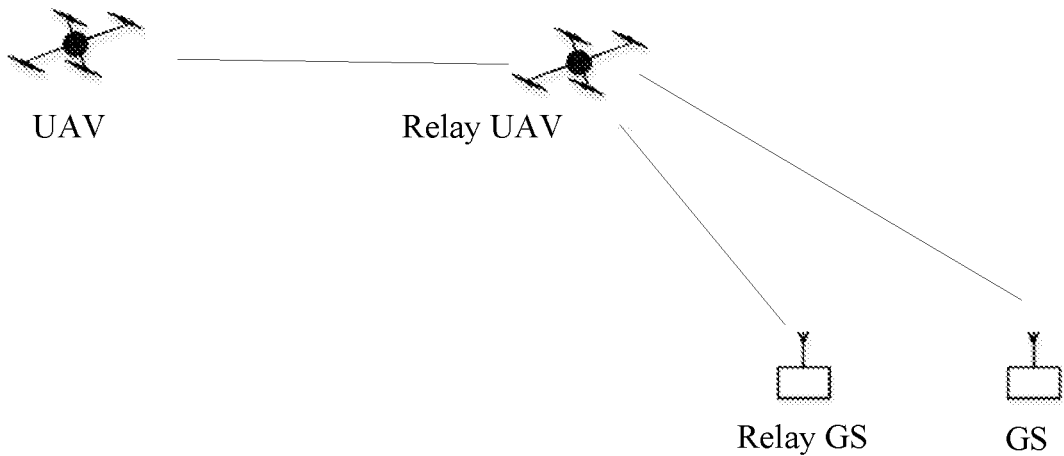
FIG. 3 schematically shows another example application scenario of an out-of-synchronization processing method consistent with embodiments of the disclosure.

FIG. 3 schematically shows another example application scenario of the out-of-synchronization processing method consistent with the disclosure. FIG. 3 shows the application scenario of a relay UAV communication system, in which the intermediate communication apparatus includes a relay UAV, the upstream communication apparatus includes a UAV, and the downstream communication apparatus includes a console or a relay console. There are a two-way communication link between the UAV and the relay UAV, a two-way communication link between the relay UAV and the console, and a two-way communication link between the relay UAV and the relay console.

In some embodiments, for the application scenario of the relay UAV communication system, the intermediate communication apparatus may include a first relay UAV, the upstream communication apparatus may include the UAV, and the downstream communication apparatus may include a second relay UAV. In some embodiments, the intermediate communication apparatus, the upstream communication apparatus, and the downstream communication apparatus can include different relay UAVs.

The present disclosure can be applied to any system including an intermediate communication apparatus, an upstream communication apparatus of the intermediate communication apparatus, and a downstream communication apparatus of the intermediate communication apparatus, where the intermediate communication apparatus needs to be synchronized with the upstream communication apparatus and the downstream communication apparatus needs to be synchronized with the intermediate communication apparatus.

Figure 4:
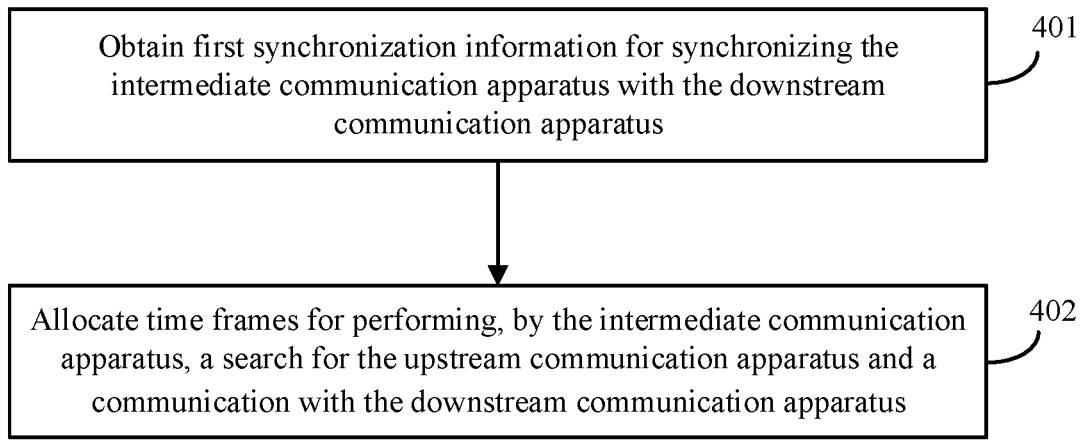
FIG. 4 is a schematic flow chart of an example out-of-synchronization processing method consistent with embodiments of the disclosure.

FIG. 4 is a schematic flow chart of an example out-of-synchronization processing method consistent with the disclosure. The method can be implemented by the intermediate communication apparatus described above for processing the out-of-synchronization between the intermediate communication apparatus and the upstream communication apparatus.

As shown in FIG. 4, at 401, first synchronization information for synchronizing the intermediate communication apparatus with the downstream communication apparatus is obtained. The first synchronization information refers to synchronization information used by the intermediate communication apparatus to communicate with the downstream communication apparatus before the intermediate communication apparatus is out-of-synchronization with the upstream communication apparatus. In some embodiments, the first synchronization information may include frequency offset information and/or time offset information. In some other embodiments, the first synchronization information may include frequency information and/or time information.

At 402, time frames are allocated for performing, by the intermediate communication apparatus, a search for the upstream communication apparatus and a communication with the downstream communication apparatus. When the intermediate communication apparatus communicates with the downstream communication apparatus, parameters of the intermediate communication apparatus can be adjusted according to the first synchronization information to complete the synchronization with the downstream communication apparatus. The parameters can include the crystal oscillator frequency and/or the clock.

It is to be noted that when the process at 402 is performed, the intermediate communication apparatus and the upstream communication apparatus are out-of-synchronization.

For example, the time frames can be arranged in a chronological order, such as time frame 1, time frame 2, time frame 3, time frame 4, time frame 5, time frame 6, . . . , and the like. The search of the upstream communication apparatus can be performed on time frame 1, time frame 3, time frame 5, . . . , and the like, and the communication with the downstream communication apparatus can be performed on time frame 2, time frame 4, time frame 6, . . . , and the like. Since the parameters of the intermediate communication apparatus can be shifted on the time frames when the intermediate communication apparatus performs the search for the upstream communication apparatus, the parameters need to be adjusted back according to the first synchronization information on the time frames when the intermediate communication apparatus performs the communicate with the downstream communication apparatus. When the first synchronization information includes the frequency information or the frequency offset information, the parameters may include the crystal oscillator frequency. When the first synchronization information includes the time offset information or the time information, the parameters may include the clock.

Consistent with the disclosure, the first synchronization information for synchronizing the intermediate communication apparatus with the downstream communication apparatus can be obtained. When the intermediate communication apparatus is out of synchronization with the upstream communication apparatus, the time frames can be allocated for performing the search of the upstream communication apparatus and the communication with the downstream communication apparatus. The parameters of the intermediate communication apparatus can be adjusted according to the first synchronization information to complete the communication with the downstream communication apparatus on the corresponding time frames. As such, it can be realized that the intermediate communication apparatus can alternatively perform the search of the upstream communication apparatus and the communication with the downstream communication apparatus by adjusting the parameters according to first synchronization information. Therefore, during intervals of the process of searching for the upstream communication apparatus, the intermediate communication apparatus can communicate with the downstream communication apparatus to ensure that the downstream communication apparatus is synchronized with the intermediate communication apparatus, thereby avoiding the problem that a downstream node may be out of control due to the intermediate communication apparatus continuously searching for the upstream communication apparatus.

Figure 5:
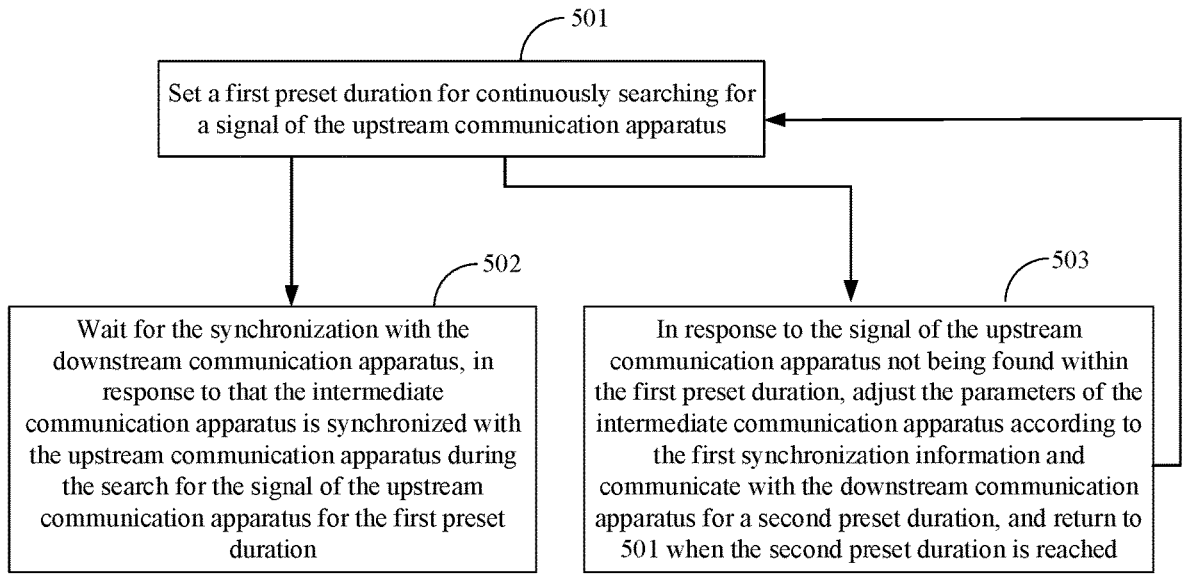
FIG. 5 is a schematic flow chart of another example out-of-synchronization processing method consistent with embodiments of the disclosure.

FIG. 5 is a schematic flow chart of another example out-of-synchronization processing method consistent with the disclosure. On the basis of the method in FIG. 4, an implementation of allocating the time frames for performing the search of the upstream communication apparatus and the communication with the downstream communication apparatus is described below. As shown in FIG. 5, the process at 402 includes the following processes.

At 501, a signal of the upstream communication apparatus is continuously searched for for a first preset duration. The communication between the intermediate communication apparatus and the downstream communication apparatus can be disconnected (i.e., no communication) during the process of continuously searching for the upstream communication apparatus. When the communication between the intermediate communication apparatus and the downstream communication apparatus is disconnected, parameters of the downstream communication apparatus may drift due to temperature, time, or the like. For example, the drift of the parameters can include a frequency drift and/or a clock drift. A longer time of a communication disconnection between the intermediate communication apparatus and the downstream communication apparatus may correspond to a greater drift of the parameters of the downstream communication apparatus. When the intermediate communication apparatus searches for the upstream communication apparatus for a short period of time, the drift of the parameters of the downstream communication apparatus may be not very large. When the intermediate communication apparatus communicates with the downstream communication apparatus based on the first synchronization information, the downstream communication apparatus can still successfully decode the signal of the intermediate communication apparatus, and thus the downstream communication apparatus can still be synchronized with the intermediate communication apparatus. Therefore, after continuously searching for the signal of the upstream communication apparatus for the first preset duration, the intermediate communication apparatus can still communicate with the downstream communication apparatus according to the first synchronization information by a reasonable choice of the first preset duration. That is, the downstream communication apparatus and the intermediate communication apparatus do not lose synchronization.

To ensure that the intermediate communication apparatus can resynchronize with the upstream communication apparatus by searching for the signal of the upstream communication apparatus, and to ensure that the downstream communication apparatus and the intermediate communication apparatus do not lose synchronization, the first preset duration can be set taking into consideration the following. If the first preset duration is too long, the drift of the parameters of the downstream communication device may be too large, thereby decreasing a possibility that the intermediate communication device and the downstream communication device can be connected again to continue communication. In addition, the long first preset duration can also result in an increase in an interval at which the intermediate communication apparatus transmits data to the downstream communication apparatus, thereby increasing a delay of the intermediate communication apparatus controlling the downstream communication apparatus. On the other hand, if the first preset duration is too short, it is disadvantageous for the intermediate communication apparatus to resynchronize with the upstream communication apparatus. Therefore, the selection of the first preset duration can be based on a requirement that the downstream communication apparatus and the intermediate communication apparatus remain synchronized and a requirement of the search for the upstream communication apparatus. In some embodiments, the first preset duration can be greater than or equal to a first threshold and less than or equal to a second threshold. The first threshold can include a minimum value of a time length satisfying the requirement of the search, and the second threshold can include a maximum value of the time length that can ensure the synchronization between the downstream communication apparatus and the intermediate communication apparatus.

In some embodiments, the search for the signal of the upstream communication apparatus may include the intermediate communication apparatus entering a full receiving state and searching for the signal of the upstream communication apparatus. In some embodiments, the search for the signal of the upstream communication apparatus may include the search for a frequency of the upstream communication apparatus.

At 502, if the intermediate communication apparatus is synchronized with the upstream communication apparatus during the search for the signal of the upstream communication apparatus for the first preset duration, the intermediate communication apparatus waits for the synchronization with the downstream communication apparatus. The intermediate communication apparatus waiting to synchronize with the downstream communication apparatus if the intermediate communication apparatus is synchronized with the upstream communication apparatus can include the following processes. The intermediate communication apparatus can transmit data to the downstream communication apparatus according to second synchronization information for resynchronizing with the upstream communication apparatus to resynchronize the downstream communication apparatus with the upstream communication apparatus. In some embodiments, the second synchronization information may include the time information and/or the frequency information, or the second synchronization information may include the time offset information and/or the frequency offset information.

At 503, if the signal of the upstream communication apparatus is not found within the first preset duration, the parameters of the intermediate communication apparatus are adjusted according to the first synchronization information, and the intermediate communication apparatus communicates with the downstream communication apparatus for a second preset duration, and the flow returns to 501 when the second preset duration is reached (i.e., at the end of the second preset duration).

During a process in which the intermediate communication apparatus adjusts the parameters of the intermediate communication apparatus according to the first synchronization information and communicates with the downstream communication apparatus for the second preset duration, the downstream communication apparatus can adjust its own parameters (e.g., the crystal oscillator frequency and/or the like) to further reduce differences from the parameters (e.g., the crystal oscillator frequency and/or the like) of the intermediate communication apparatus. In the second preset duration, the differences between the parameters of the intermediate communication apparatus and the parameters the downstream communication apparatus can be maintained within a relatively small range by continuously tracking the parameters of the intermediate communication apparatus.

In some embodiments, a value of the second preset duration can be set by considering the following factors. On the one hand, in order to ensure that the downstream communication apparatus can be synchronized with the intermediate communication apparatus, the differences between the parameters of the downstream communication apparatus and the parameters of the upstream communication apparatus need to be maintained within the relatively small range. On the other hand, in order to ensure that the intermediate communication apparatus can resynchronize with the upstream communication apparatus as soon as possible, the intermediate communication apparatus needs to allocate a relatively long time for searching for the upstream communication apparatus. In some embodiments, the second preset duration can be greater than or equal to a third threshold. The third threshold can include a minimum value that enables the difference between the crystal oscillator frequency of the downstream communication apparatus and the crystal oscillator frequency of the intermediate communication apparatus to converge to a stable value.

Therefore, the reasonable selections of the first preset duration and the second preset duration can be achieved, such that the downstream communication apparatus can be synchronized with the intermediate communication apparatus and the intermediate communication apparatus can be resynchronized with the upstream communication apparatus as early as possible. In some embodiments, a ratio of the first preset duration to the second preset duration can be between 0.5 and 2. In some other embodiments, a duty ratio of the communication between the intermediate communication apparatus and the downstream communication apparatus can be between ⅓ and ⅔.

Consistent with the disclosure, the intermediate communication apparatus can continuously search for the signal of the upstream communication apparatus for the first preset duration. If the intermediate communication apparatus is synchronized with the upstream communication apparatus during the search for the signal of the upstream communication apparatus for the first preset duration, the intermediate communication apparatus can wait for the synchronization with the downstream communication apparatus. If the signal of the upstream communication apparatus is not found within the first preset duration, the parameters of the intermediate communication apparatus can be adjusted according to the first synchronization information, and the intermediate communication apparatus can communicate with the downstream communication apparatus for the second preset duration. When the second preset duration is reached, the processes described above can be repeated. As such, during the intervals of the process of searching for the upstream communication apparatus, the intermediate communication apparatus can communicate with the downstream communication apparatus to ensure that the downstream communication apparatus is synchronized with the intermediate communication apparatus, thereby avoiding the problem that the downstream node may be out of control due to the intermediate communication apparatus continuously searching for the upstream communication apparatus.

Figure 6:
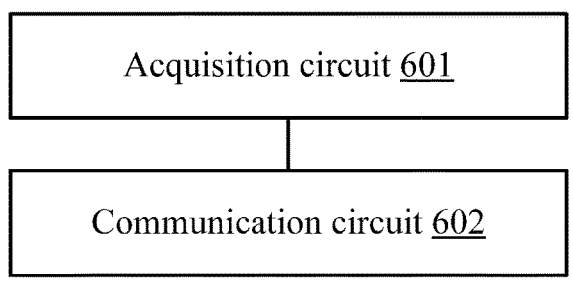
FIG. 6 is a schematic structural diagram of an example intermediate communication apparatus consistent with embodiments of the disclosure.

FIG. 6 is a schematic structural diagram of an example intermediate communication apparatus consistent with the disclosure. The intermediate communication apparatus can be the intermediate communication apparatus of the communication system described above, for example, the communication system in FIG. 1. The communication system can include the intermediate communication apparatus, the upstream communication apparatus and the downstream communication apparatus of the intermediate communication apparatus.

As shown in FIG. 6, the intermediate communication apparatus includes an acquisition circuit 601 and a communication circuit 602. The acquisition circuit 601 can be configured to obtain the first synchronization information for synchronizing the intermediate communication apparatus with the downstream communication apparatus.

The communication circuit 602 can be configured to allocate the time frames for performing, by the intermediate communication apparatus, the search for the upstream communication apparatus and the communication with the downstream communication apparatus. The parameters of the intermediate communication apparatus can be adjusted according to the first synchronization information to complete the synchronization with the downstream communication apparatus.

In some embodiments, the communication circuit 602 can be configured to continuously search for the signal of the upstream communication apparatus for the first preset duration (process A). The communication circuit 602 can be further configured to, if the intermediate communication apparatus is synchronized with the upstream communication apparatus during the search for the signal of the upstream communication apparatus for the first preset duration, wait for the synchronization with the downstream communication apparatus, and if the signal of the upstream communication apparatus is not found within the first preset duration, adjust the parameters of the intermediate communication apparatus according to the first synchronization information and communicate with the downstream communication apparatus for the second preset duration (process B). The communication circuit 602 can be further configured to repeat processes A and B, when the second preset duration is reached.

In some embodiments, the first preset duration can be greater than or equal to the first threshold and less than or equal to the second threshold. The first threshold can include the minimum value of the time length satisfying the requirement of the search, and the second threshold can include a maximum value of a time length that can ensure the synchronization between the downstream communication apparatus and the intermediate communication apparatus.

In some embodiments, the second preset duration can be greater than or equal to the third threshold. The third threshold can include the minimum value that enables the difference of the crystal oscillator frequency of the downstream communication apparatus and the crystal oscillator frequency of the intermediate communication apparatus to converge to the stable value.

In some embodiments, when waiting for the synchronization with the downstream communication apparatus in response to the intermediate communication apparatus being synchronized with the upstream communication apparatus, the communication circuit 602 can transmit data to the downstream communication apparatus according to the second synchronization information for resynchronizing with the upstream communication apparatus to resynchronize the downstream communication apparatus with the upstream communication apparatus.

In some embodiments, the ratio of the first preset duration to the second preset duration can be between 0.5 and 2. In some embodiments, a duty ratio of the communication between the communication circuit 602 and the downstream communication apparatus can be between ⅓ and ⅔.

In some embodiments, when searching for the signal of the upstream communication apparatus, the communication circuit 602 can enter the full receiving state and search for the signal of the upstream communication apparatus. In some embodiments, the first synchronization information may include the frequency offset information and/or the time offset information. In some other embodiments, the first synchronization information may include the frequency information and/or the time information.

The intermediate communication apparatus in FIG. 6 can implement the out-of-synchronization processing method consistent with the disclosure, for example, one of the example methods described above in connection with FIGS. 4 and 5. The implementation principle and technical effects of the apparatus are similar to those of the method, and detailed description is omitted herein.

The present disclosure further provides a communication system including the intermediate communication apparatus in FIG. 6, the upstream communication apparatus and the downstream communication apparatus of the intermediate communication apparatus.

In some embodiments, the intermediate communication apparatus can include a GS, the upstream communication apparatus can include a BS, and the downstream communication apparatus includes a UAV. In some other embodiments, the intermediate communication apparatus can include a relay UAV, the upstream communication apparatus can include a UAV, and the downstream communication apparatus can include a GS or a relay GS.

Those skill in the art will appreciate that some or all of the processes of the methods described above can be implemented by hardware associated with program codes, such as an apparatus including a processor and a computer readable storage medium. The program codes can be stored in the computer readable storage medium. The program codes, when being executed by the processor, can cause the processor to perform a method consistent with the disclosure, such as one of the example methods described above. The computer readable storage medium can include any medium that can store the program codes, such as a read-only memory (ROM), a random access memory (RAM), a magnetic disk, an optical disk, or the like.

It is intended that the embodiments disclosed herein are merely for illustrating the technical solutions of the present disclosure and not to limit the scope of the disclosure. Changes, modifications, alterations, and variations of the above-described embodiments may be made by those skilled in the art without departing from the scope of the disclosure. The scope of the invention can be defined by the following claims or equivalent thereof.

What is claimed is:

1. An out-of-synchronization processing method comprising:
obtaining, by an intermediate communication apparatus, synchronization information for synchronizing with a downstream communication apparatus; and
performing, by the intermediate communication apparatus, a search for an upstream communication apparatus and a communication with the downstream communication apparatus;
wherein a parameter is adjusted according to the synchronization information during the communication with the downstream communication apparatus.

2. The method of claim 1, wherein performing the search for the upstream communication apparatus and the communication with the downstream communication apparatus includes:
continuously searching for a signal of the upstream communication apparatus for a first preset duration;
in response to that the intermediate communication apparatus is synchronized with the upstream communication apparatus during the search for the signal of the upstream communication apparatus for the first preset duration, waiting for synchronizing with the downstream communication apparatus; and
in response to that the signal of the upstream communication apparatus is not found within the first preset duration:
adjusting the parameter of the intermediate communication apparatus according to the synchronization information; and
communicating with the downstream communication apparatus for a second preset duration.

3. The method of claim 2, wherein:
the first preset duration is greater than or equal to a first threshold and less than or equal to a second threshold;
the first threshold is a minimum value of a time length satisfying a requirement of the search; and
the second threshold is a maximum value of a time length ensuring a synchronization between the downstream communication apparatus and the intermediate communication apparatus.

4. The method of claim 2, wherein the second preset duration is greater than or equal to a third threshold, the third threshold being a minimum value enabling a difference between a crystal oscillator frequency of the downstream communication apparatus and a crystal oscillator frequency of the intermediate communication apparatus to converge to a stable value.

5. The method of claim 2, wherein:
the synchronization information is first synchronization information; and
waiting for synchronizing with the downstream communication apparatus includes transmitting data to the downstream communication apparatus according to second synchronization information to resynchronize the downstream communication apparatus with the upstream communication apparatus, the second synchronization information including information for resynchronizing with the upstream communication apparatus.

6. The method of claim 2, wherein a ratio of the first preset duration to the second preset duration is between 0.5 and 2, and a duty ratio of the communication between the intermediate communication apparatus and the downstream communication apparatus is between ⅓ and ⅔.

7. The method of claim 2, wherein searching for the signal of the upstream communication apparatus includes:
entering a full receiving state; and
searching for the signal of the upstream communication apparatus in the full receiving state.

8. The method of claim 1, wherein the synchronization information includes at least one of frequency offset information or time offset information.

9. The method of claim 1, wherein the synchronization information includes at least one of frequency information or time information.

10. An intermediate communication apparatus comprising:
an acquisition circuit configured to obtain synchronization information for synchronizing with a downstream communication apparatus; and
a communication circuit configured to perform a search for an upstream communication apparatus and a communication with the downstream communication apparatus;
wherein a parameter is adjusted according to the synchronization information during the communication with the downstream communication apparatus.

11. The intermediate communication apparatus of claim 10, wherein the communication circuit is further configured to:
continuously search for a signal of the upstream communication apparatus for a first preset duration;
in response to that the intermediate communication apparatus is synchronized with the upstream communication apparatus during the search for the signal of the upstream communication apparatus for the first preset duration, wait for synchronizing with the downstream communication apparatus; and
in response to that the signal of the upstream communication apparatus is not found within the first preset duration:
adjust the parameter of the intermediate communication apparatus according to the synchronization information; and
communicate with the downstream communication apparatus for a second preset duration.

12. The intermediate communication apparatus of claim 11, wherein:
the first preset duration is greater than or equal to a first threshold and less than or equal to a second threshold;
the first threshold is a minimum value of a time length satisfying a requirement of the search; and
the second threshold is a maximum value of a time length ensuring a synchronization between the downstream communication apparatus and the intermediate communication apparatus.

13. The intermediate communication apparatus of claim 11, wherein the second preset duration is greater than or equal to a third threshold, the third threshold being a minimum value enabling a difference between a crystal oscillator frequency of the downstream communication apparatus and a crystal oscillator frequency of the intermediate communication apparatus to converge to a stable value.

14. The intermediate communication apparatus of claim 11, wherein:
the synchronization information is first synchronization information; and
the communication circuit is further configured to transmit data to the downstream communication apparatus according to second synchronization information to resynchronize the downstream communication apparatus with the upstream communication apparatus, the second synchronization information including information for resynchronizing with the upstream communication apparatus.

15. The intermediate communication apparatus of claim 11, wherein a ratio of the first preset duration to the second preset duration is between 0.5 and 2, and a duty ratio of the communication between the intermediate communication apparatus and the downstream communication apparatus is between $1/3$ and $2/3$.

16. The intermediate communication apparatus of claim 11, wherein the communication circuit is further configured to:
enter a full receiving state; and
search for the signal of the upstream communication apparatus in the full receiving state.

17. The intermediate communication apparatus of claim 10, wherein the synchronization information includes at least one of frequency offset information or time offset information.

18. A communication system comprising:
an intermediate communication apparatus including an acquisition circuit and a communication circuit;
an upstream communication apparatus of the intermediate communication apparatus; and
a downstream communication apparatus of the intermediate communication apparatus;
wherein:
the acquisition circuit is configured to obtain synchronization information for synchronizing with the downstream communication apparatus;
the communication circuit is configured to perform a search for the upstream communication apparatus and a communication with the downstream communication apparatus; and
a parameter is adjusted according to the synchronization information during the communication with the downstream communication apparatus.

19. The system of claim 18, wherein:
the intermediate communication apparatus includes a console (GS);
the upstream communication apparatus includes a base station (BS); and
the downstream communication apparatus includes an unmanned aerial vehicle (UAV).

20. The system of claim 18, wherein:
the intermediate communication apparatus includes a relay unmanned aerial vehicle (UAV);
the upstream communication apparatus includes a UAV; and
the downstream communication apparatus includes a console (GS) or a relay GS.

* * * * *